United States Patent [19]
Conkle

[11] Patent Number: 6,092,736
[45] Date of Patent: Jul. 25, 2000

[54] PORTABLE ATHLETIC FIELD WATER FOUNTAIN

[76] Inventor: Terry L. Conkle, 3104 Chase, Wichita, Kans. 67217

[21] Appl. No.: 09/363,589

[22] Filed: Jul. 29, 1999

[51] Int. Cl.[7] .............................. B05B 12/14; E03B 9/20
[52] U.S. Cl. .......................... 239/29.3; 239/24; 239/722
[58] Field of Search ................................ 239/16, 24, 28, 239/29, 29.3, 104, 120, 121, 145, 273, 279, 547, 566, 722

[56] References Cited

U.S. PATENT DOCUMENTS

| | | | |
|---|---|---|---|
| 937,588 | 10/1909 | Frazee | 239/29 |
| 2,575,936 | 11/1951 | Andrews | 239/29.3 |
| 4,298,166 | 11/1981 | White et al. | 239/24 |
| 5,782,407 | 7/1998 | VanDegrift | 239/24 |

*Primary Examiner*—Andres Kashnikow
*Assistant Examiner*—Sean P. O'Hanlon
*Attorney, Agent, or Firm*—Davis & Jack, L.L.C.; Kenneth Jack

[57] ABSTRACT

A portable athletic field water fountain consisting of a base frame having a plurality of inwardly facing walls; a floor fixedly attached to and positioned upon the base frame so that the upper surface of the floor spans between the inwardly facing walls of the base frame, and so that such inwardly facing walls extend upwardly from the upper surface of the floor, the floor and the inwardly facing walls of the base frame forming a water collection basin; a pallet positioned within the water collection basin, the pallet being adapted for supporting an athlete standing thereon and elevating the athlete above water within the water collection basin; wheels extending downwardly from the lower surface of the base frame; a tube having a plurality of water emission apertures; and a tube support frame, positioning the tube over the basin so that water emitted from the tube falls into the water collection basin.

18 Claims, 4 Drawing Sheets

PORTABLE ATHLETIC FIELD WATER FOUNTAIN

FIELD OF THE INVENTION

This invention relates to drinking fountain devices. More particularly, this invention relates to such devices adapted for utilization in an outdoor setting upon athletic and sports fields such as football fields and baseball diamonds.

BACKGROUND OF THE INVENTION

U.S. Pat. No. 2,948,476 issued Aug. 9, 1960, to J. E. Don discloses a portable drinking water fountain for use on athletic fields to supply water to athletes. A defect or disadvantage of the fountain disclosed in Don arises from the said fountain's failure to incorporate any element or structure for prevention of accumulation of water upon the ground surrounding the fountain. Use of fountain devices similar to that disclosed in Don upon sports practice fields and the like will typically result in an undesirable mud bog surrounding the fountain. Another example of a portable drinking fountain for use upon athletic fields is disclosed in U.S. Pat. No. 3,142,443 issued Jul. 28, 1964, to C. B. Morgan. Use of portable athletic field drinking fountains such as that disclosed in Morgan similarly results in undesirable muddy ground conditions surrounding the fountain.

The instant inventive portable athletic field drinking fountain overcomes such noted disadvantages, among others, of the apparatuses of Morgan and Don by configuring a base frame of a drinking fountain so that it performs multiple functions, including athlete support, fountain support, water collection, and portability.

BRIEF SUMMARY OF THE INVENTION

A major structural element of the instant inventive portable athletic field water fountain preferably comprises a rectangular rigid frame constructed of square tubing. Preferably, the cross sectional dimensions of such square tubing is 2"×2"–3"×3", the tubing being welded at corner joints to form a rectangle approximately 4'×8'. The overall dimensions of the rectangular frame of square tubing may suitably vary depending upon the number and size of athletes to be served by the water fountain. Preferably, the rectangular rigid square tubing frame is aluminum due to its light weight and high strength characteristics. Other metals such as steel or stainless steel may suitably be utilized. Base frames having shapes other than rectangular and fabricated from other materials may be suitably utilized.

A sheet metal floor is preferably fixedly attached to a lower surface of the rectangular square tubing frame, causing the inwardly facing walls of the square tubing frame in combination with the upper surface of the sheet metal floor to form a water collection basin. Preferably, the sheet metal floor spans between the entire width and length of the rectangular frame. Also preferably, the floor is heat fusion welded to the rectangular frame along all seams and junctures therebetween to form a water tight water basin. Like the rectangular base frame, it is preferable that the sheet metal floor be composed of aluminum.

In order to provide structural rigidity to the sheet metal floor, it is preferable that a plurality of tubular aluminum cross beams be welded to the under surface of the sheet metal floor, such cross beams preferably laterally traversing the short dimension of the rectangle. Preferably, a centrally oriented pair of such reinforcing crossbeams comprises rectangular tubing of a size capable of receiving the lift arms of a common forklift. Through proper positioning and sizing, such rectangular tubing crossbeams desirably perform dual functions of structurally reinforcing the sheet metal floor and rectangular frame, and adapting the water fountain for portable movement through utilization of a forklift. Each of the tubular metal crossbeams welded to the undersurface of the sheet metal floor are preferably composed of aluminum for strength and weight reduction.

Preferably, a pair of swivel caster wheels and a pair of fixed axle wheels are fixedly attached to the undersurface of the rectangular frame so that such wheels extend downwardly therefrom. Preferably, the swivel caster wheels are paired across one of the short sides of the rectangular base, while the fixed axle wheels are paired across the opposite short side of the rectangle, such wheel positioning allowing the water fountain to be conveniently maneuvered and rolled through gateways and other narrow openings. Preferably, wheel attachment plates, swivel plates, swivel rods, wheel axles, and devices which are integral components of the wheels are composed of steel for durability. Also preferably, each of the wheels has a pneumatically inflatable tire therearound, allowing the wheels to efficiently roll over rough surfaces without incurring premature wear or damage. Preferably, each of the fixed axle wheels and swivel caster wheels are fixedly attached to the rectangular frame by means of threaded nuts and bolts, the bolts extending through bolt receiving apertures extending vertically through the corners of the square tubing of the rectangular frame. Under circumstances where the inventive water fountain is not required to be moved long distances across the ground, the wheels may suitably be replaced with rectangular skid plates which extend downwardly from the undersurface of the rectangular frame.

Preferably, a pair of handles are fixedly attached to the outwardly facing surface of the square tubing member of the rectangular base frame which extends over the swivel caster wheels; such handles assisting in manually pulling the water fountain across the ground. Alternately, a tow bar and tow bar attachment brackets may be mounted upon such end, allowing the water fountain to be conveniently towed by a tractor or other motorized vehicle.

Preferably, a short segment of aluminum pipe having a common garden hose coupling rotatably mounted upon an outer end is extended through and fixedly welded within a water drainage aperture; such aperture extending horizontally through one of the square tubing members of the rectangular base frame. Preferably, such drainage pipe is mounted at the end of the water fountain opposite the end supporting the handles and the swivel caster wheels. Through utilization of such drainage pipe, water collecting within the water collection basin may drain therethrough, and thence drain through an attached garden hose to emit at a convenient water drainage point, preventing undesirable accumulation of water and mud on playing field surfaces.

Preferably, a fountain support frame is removably attached to the upper surface of the rectangular frame, such support frame being oriented so that it extends substantially perpendicularly upward therefrom. Preferably, such water fountain support frame comprises a pair of square tubing columns, such columns being removably attached to the rectangular frame by means of slip joints. For structural rigidity and water fountain support, it is preferable that a pair of parallel crossbeams be welded to the vertical columns so that they horizontally span therebetween. Preferably, an uppermost crossbeam among the pair of crossbeams interlinks the upper ends of the vertical columns. Also preferably, the crossbeams and the vertical columns are oriented along the longitudinal midline of the water fountain.

Preferably, the upper surface of the uppermost crossbeam of the fountain support frame is utilized to provide base support for a length of polyvinyl chloride (PVC) tubing, such PVC tubing having a plurality of drinking water emitting apertures. Preferably, an end of the PVC tube overlying the end of the base frame which supports the handles or tow bar and swivel caster wheels is capped; while the opposite end of such tube is openended, such open end having a valve means controlling water flow therethrough, and having a common garden hose coupling. Preferably, the PVC tube is fixedly attached to the upper surface of the upper crossbeam.

In order to prevent athletes from placing their mouths over and directly drinking from the water emission apertures of the PVC tube, it is preferable that a "V" channel beam be mounted in an upwardly opening orientation, such beam longitudinally overlying the PVC tube. The "V" channel beam, so positioned, serves as an elongated mouth guard. Preferably, a series of rectangular attachment plates are welded to and span between the "V" channel beam and the upper crossbeam for support of the "V" channel beam over the PVC tube.

In operation of the inventive portable drinking fountain, water emitting from the water emission apertures of the PVC tube falls into the water collection basin. The water is then conveniently carried away through the water drainage pipe and attached garden hose. It is preferable that athletes seeking to drink from the fountain step onto the rectangular base while drinking in order to prevent excessive wear and erosion of ground surfaces surrounding the drinking fountain. However, it is undesirable for athletes drinking from the fountain to step into the basin where water collects. Therefore, it is preferable that a pair of pivotally mounted water permeable step plates or pallets be situated within the basin. Preferably, such pallets are oblong and are oriented longitudinally along the long dimension of the water fountain. Also preferably, each such pallet comprises a rectangular aluminum frame covered by a water permeable aluminum grid. Pivotal mounting of the pallets by means of hinges is preferable, such mounting allowing the pallets to be positioned for use as a relatively dry stepping surface, and allowing the pallets to be alternately pivotally moved out of the basin for ease of cleaning of mud and debris out of the basin. Suitably, the pallets may simply rest with the basin with no pivotal or other attachment applied thereto.

Accordingly, it is an object of the present invention to provide a water fountain device having a base member adapted to serve multiple functions including facilitation of portability through downward extension of wheels or slide plates, facilitation of portability through provision of forklift receiving channels, avoidance of undesirable ground moisture in the vicinity of the fountain through the provision of a water collecting basin, providing a stepping surface for athletes, and providing a fountain frame support.

Other and further objects, benefits and advantages of the present invention will become known to those skilled in the art upon review of the appended drawings and the descriptions which follow.

DETAILED DESCRIPTION OF THE PREFERRED EMBODIMENT

Figure 1:
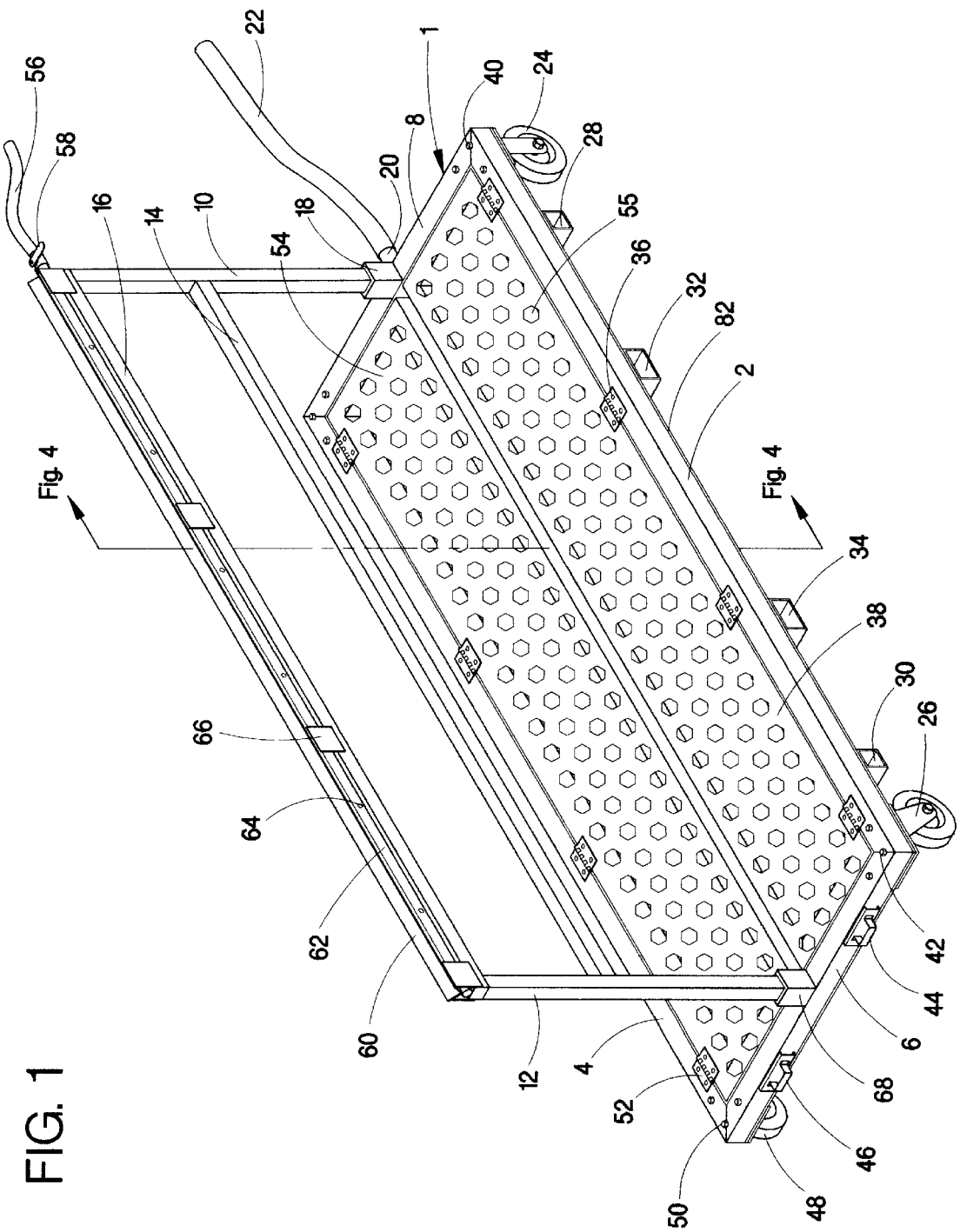
FIG. 1 is an isometric view of the present inventive portable athletic field water fountain.

Referring now to the drawings, and in particular to FIG. 1, the present inventive water fountain is referred to generally by reference numeral 1. The water fountain 1 preferably has a square tubing base frame comprising a pair of longitudinally extending members 2 and 4, and a pair of laterally extending members 6 and 8. Preferably, the square tubing members 2, 4, 6, and 8 are each between 21"×2" and 3"×3" in cross-sectional dimension. Also preferably, such members are composed of aluminum for strength and weight economy. Square tubing members 2, 4, 6, and 8 are preferably heat fusion welded at their four junctures forming a rigid rectangular base frame.

Figure 3:
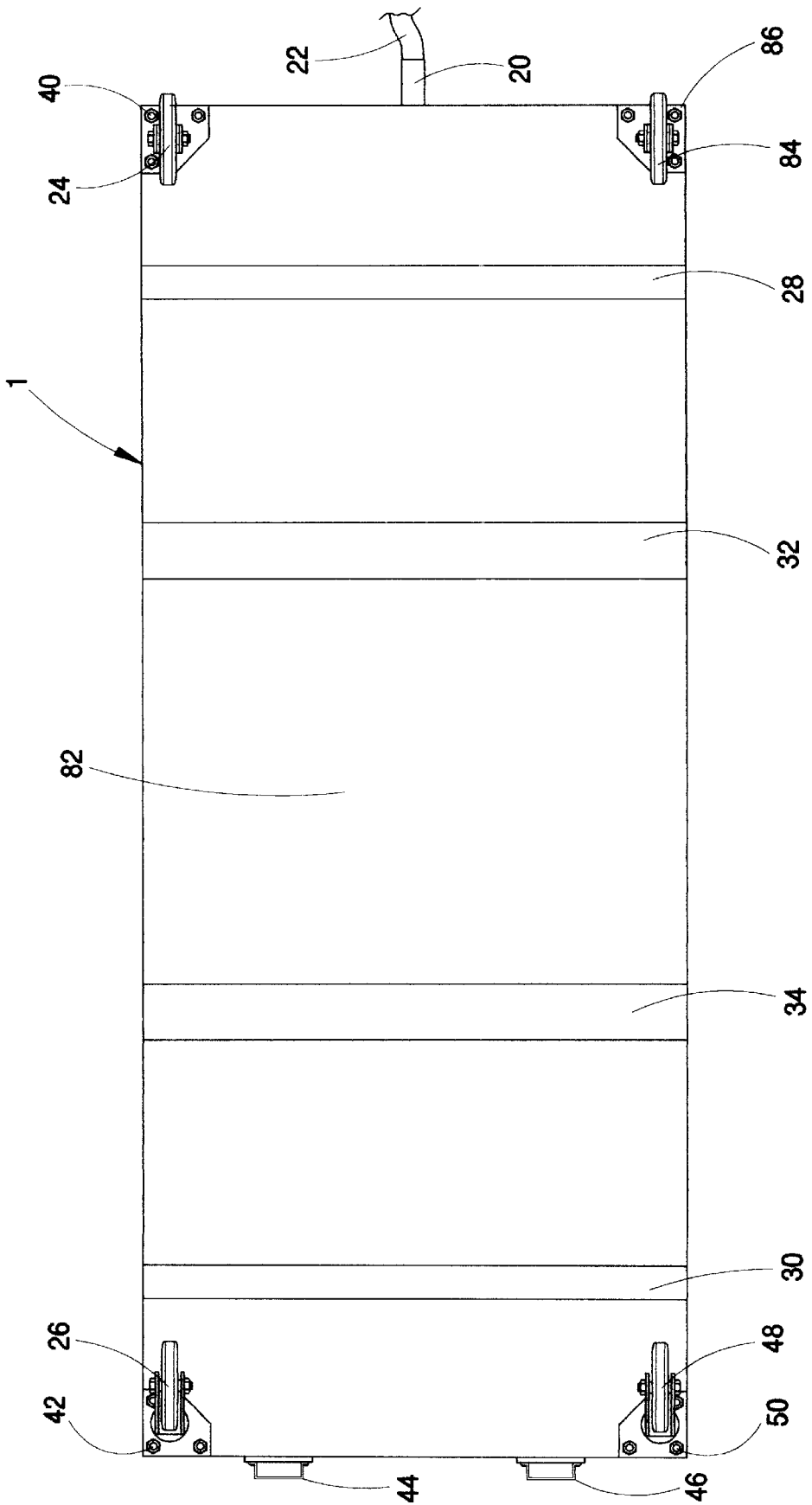
FIG. 3 is a view from below of the inventive water fountain.
Figure 4:
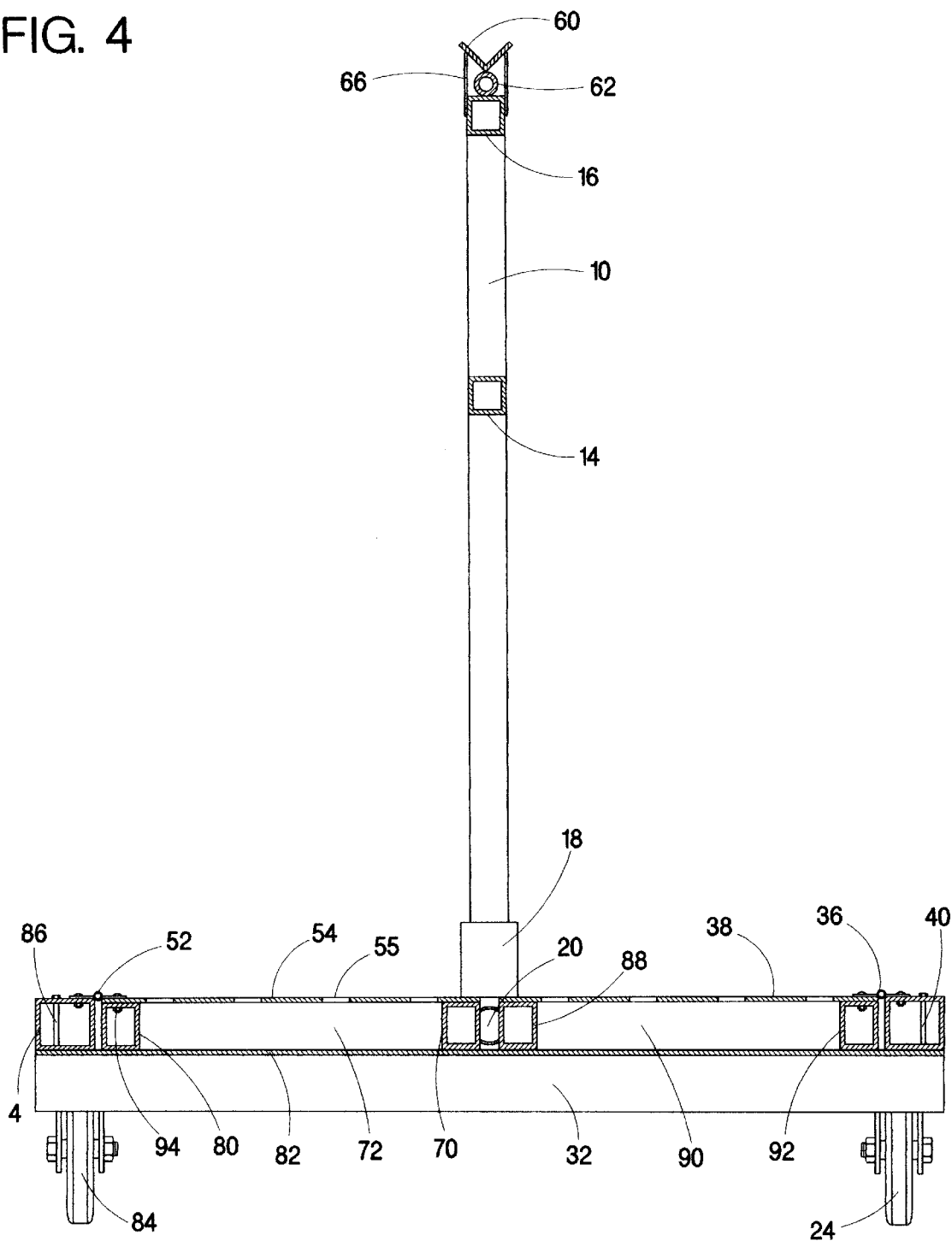
FIG. 4 is a sectional view of the inventive water fountain as indicated in FIG. 1.

Referring simultaneously to FIGS. 1, 3, and 4, a sheet metal floor 82 preferably composed of aluminum is preferably fixedly welded to the under surfaces of square tubing base frame members 2, 4, 6, and 8, allowing the inwardly facing surfaces of such members in combination with the upper surface of sheet metal floor 82 to form a water collection basin. Preferably, a continuous heat fusion weld is utilized to attach the sheet metal floor 82 to the under surface of the square tubing members 2, 4, 6, and 8, such weld creating a water tight perimeter seal.

Referring simultaneously to FIGS. 1 and 3, swivel caster wheels 48 and 26 are preferably fixedly attached to the under surface of the fountain 1 by means of threaded bolts and nuts 42 and 50. Similarly, fixed axle wheels 24 and 84 are preferably mounted upon the under surface of the opposite end of the water fountain 1 by means of threaded bolts and nuts 40 and 86. Preferably, the wheels 24, 26, 48 and 84 comprise pneumatically inflatable tires for ease of rolling over rough surfaces. Suitably, wheels 24, 26, 48 and 84 may be replaced by welding slide plates (not drawn) to the under surface of the water fountain 1. Where frequent movement of the water fountain 1 over significant distances is desired, utilization of such slide plates as substitute for wheels may be undesirable.

Referring further simultaneously to FIGS. 1 and 3, tubular aluminum crossbeams 28, 30, 32 and 34 are preferably welded to the under surface of the floor 82 to provide structural rigidity to the floor. Preferably, the middle pair of such tubular crossbeams 32 and 34 have a rectangular cross-sectional shape, such shape providing forklift arm receiving channels, allowing the water fountain 1 to be conveniently moved through utilization of a forklift.

Referring simultaneously to FIGS. 1 and 4, square tubing frame member 8 preferably has a section of aluminum pipe 20 extending therethrough, such pipe section being fixedly welded thereto to form water drainage port. Preferably, a flexible hose 22, such as a common garden hose, is coupled to pipe 20 allowing water collecting within the basin of the water fountain 1 to drain away from the fountain area to an acceptable water drainage area.

Referring to FIG. 1, handles 44 and 46 are preferably fixedly mounted upon tubular frame member 6 allowing the water fountain 1 to be conveniently pulled and rolled over athletic field ground surfaces. Alternately, a tow bar (not shown) and tow bar mounting brackets (not shown) may be mounted in addition to or in place of handles 44 and 46 allowing the water fountain 1 to be conveniently towed by a motorized vehicle such as a tractor.

Referring further to FIG. 1, a fountain supporting frame is preferably removably attached to the water fountain base by means of slip joints 18 and 68, the slip joints 18 and 68 securely holding in an upwardly extended orientation a pair of tubular aluminum columns 10 and 12, such columns being interconnected by tubular aluminum crossbeams 14 and 16. Preferably, the upper surface of the upper tubular aluminum crossbeam 16 supports a length of polyvinyl chloride (PVC) tubing 62, such tubing having a plurality of water emission apertures 64. The water emission apertures 64 allow water flowing through the tube 62 to emit, in an arcuate path through the air, allowing athletes to drink therefrom, and allowing excess water to fall downward onto the floor 82.

Preferably, a "V" channeled beam 60 is fixedly mounted over the PVC tube 62 by means of attachment plates 66, the "V" channel beam 60 preventing athletes from placing their mouths over apertures 64 while drinking.

Preferably, attachment plates 66 serve dual purposes of securing the PVC tube 62 in place and supporting the "V" channel beam 60. Suitably, "U" bolts (not shown) may be utilized for securing the PVC tube 62 onto the upper surface of crossbeam 16. Preferably, water flow through PVC tube 62 is controlled by a valve 58, and preferably, water is supplied to the PVC tube 62 via a common garden hose 56. Preferably, the end of the PVC tube 62 opposite the valve 58 is closed by a cap.

Figure 2:
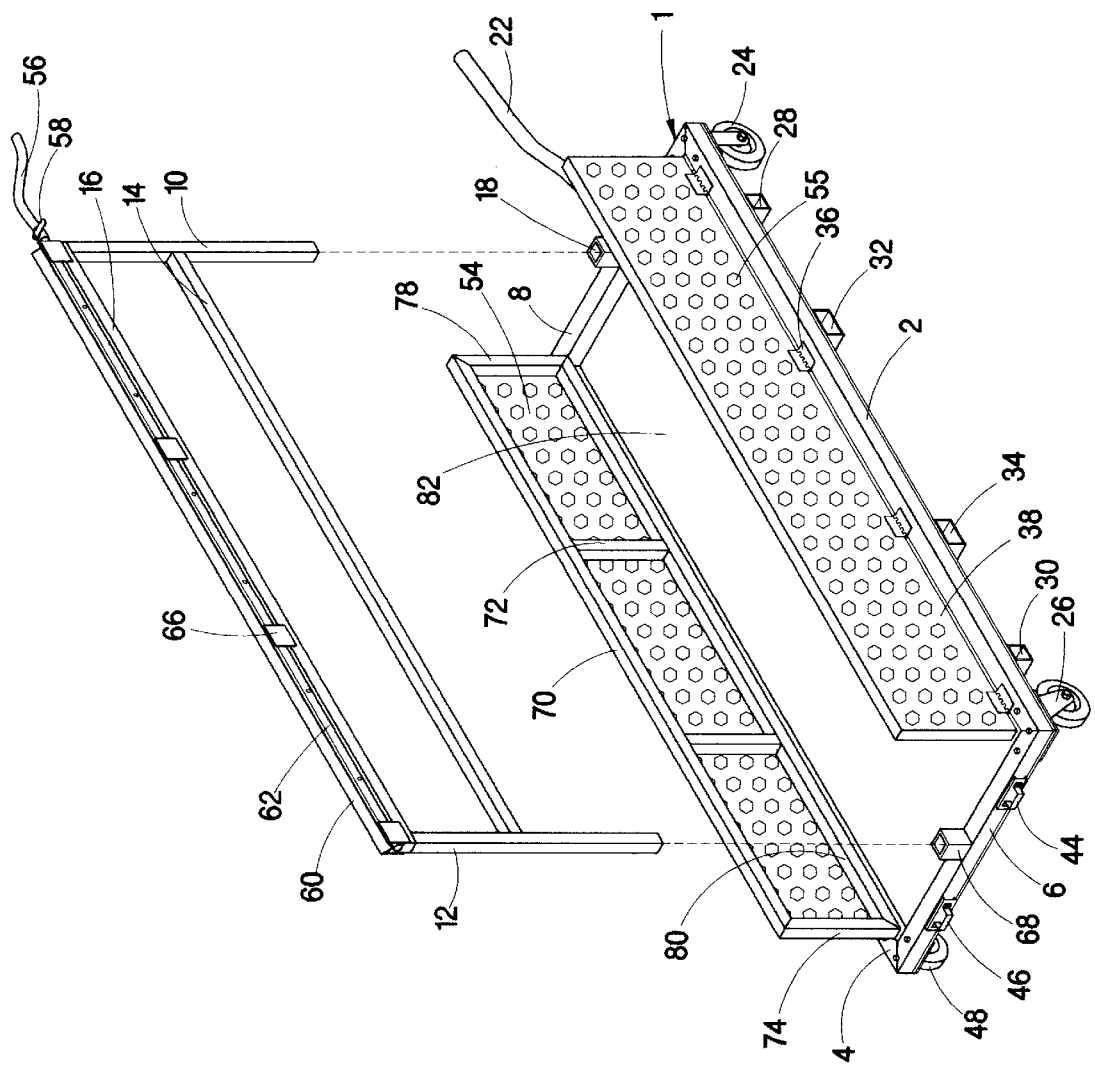
FIG. 2 is a partially exploded view of the water fountain depicted in FIG. 1, said view showing pallet/step plates in their outwardly extended positions.

Referring simultaneously to FIGS. 1, 2, and 4, the water fountain 1 preferably includes a pair of pivotally mounted water permeable step plates or pallets, such pallets comprising longitudinal frame members 70, 80, 88, and 92, and cross members 72, 74, 78, and 90. Preferably, water permeable aluminum grids 54 and 38 are fixedly welded to the upper surfaces of the pallet frame members, such grids 54 and 38 having a multiplicity of water receiving apertures 55 therethrough allowing excess water falling from water emission apertures 64 to freely flow therethrough onto the floor 82. Preferably, the pallets are pivotally mounted onto the rectangular frame by means of hinges 36 and 52. Alternately, the pallets may simply rest upon the upper surface of the floor 82 with no other fixed attachment to the water fountain 1.

In use of the present inventive water fountain 1, referring simultaneously to FIGS. 1 and 2, the water fountain 1 is rollably moved upon swivel caster wheels 26 and 48 and upon fixed axle wheels 24 and 84 over the ground surface of an athletic field to a convenient drinking station location. Upon positioning of the water fountain 1 in a desired location upon an athletic field, a water supply hose 56 is coupled with the input end of valve 58, and a water drainage hose 22 is coupled with drainage pipe 20. The opposite end of hose 22 is preferably extended to a remote drainage point to avoid creation of an undesirable muddy area upon the athletic field. Upon introduction of a supply of water into hose 56, and upon opening of valve 58, water flows into and through PVC tube 62 to emit out of water emission aperture 64 in an arcuately curved path, falling downward toward grids 54 and 38. Water passing through the apertures 55 of grids 54 and 38 falls on to the upper surface of floor 82 to emit through pipe 20 and to drain through hose 22. In use, an athlete seeking to drink from the water fountain 1 simply approaches the fountain and steps upon the upper surface of grid 54 or grid 38. From such position, an athlete in need of a drink can conveniently drink from water emitting from water emission apertures 64. Installation of "V" channel beam 60 over PVC tube 62 prevents the athlete from unsanitarily drinking from water emission apertures 64 with his or her mouth directly thereover.

Referring further to FIGS. 1 and 2, while athletes stand upon the upper surfaces of grids 54 or 38, dirt and debris from such athletes feet commonly will fall onto such grids and through apertures 55 to accumulate upon the upper surface of floor 82. Such accumulation of dirt and debris gives rise to a need to clean the interior of the basin. The interior of the basin is conveniently cleaned by slidably moving columns 12 and 10 from slip joints 68 and 18, and pivotally swinging the pallets away from floor 82 as indicated in FIG. 2.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A portable athletic field water fountain comprising:
    (a) a base frame, the base frame having an upper surface, a lower surface, and a plurality of inwardly facing walls;
    (b) a floor having an upper surface, the floor being fixedly attached to and positioned upon the base frame so that the upper surface of the floor spans between the inwardly facing walls of the base frame, and so that such inwardly facing walls extend upwardly from the upper surface of the floor, the floor and the inwardly facing walls of the base frame forming a water collection basin;
    (c) at least a first pallet, the at least first pallet being positionable within the water collection basin, and being adapted for, while so positioned, supporting at least a first athlete above water collected within the water collection basin;
    (d) a plurality of wheels rotatably mounted upon the base frame, each wheel among the plurality of wheels extending downwardly from the base frame;
    (e) a tube having an inner surface, an outer surface, and a plurality of water emission apertures extending from the inner surface to the outer surface; and,
    (f) a tube support frame fixedly attached to the tube and spanning between the tube and the base frame, the tube support frame positioning the tube over the base frame so that water emitting from the water emission apertures falls into the water collection basin.

2. The portable athletic field water fountain of claim 1 wherein the at least first pallet comprises a water permeable grid and a grid supporting frame, the water permeable grid being fixedly attached to an upper surface of the grid supporting frame.

3. The portable athletic field water fountain of claim 2 further comprising a second pallet positionable within the water collection basin, the second pallet being adapted for, while so positioned, supporting a second athlete above water collected within the water collection basin.

4. The portable athletic field water fountain of claim 3 wherein the second pallet comprises a second water permeable grid and a second grid support frame, the second water permeable grid being fixedly attached to an upper surface of the second grid support frame.

5. The portable athletic field water fountain of claim 4 wherein the at least first pallet and the second pallet are pivotally mounted upon the base frame so that they may pivotally move between respective first and second positions, the at least first and the second pallets being positioned within the water collection basin upon pivotal movements to their first positions, the at least first and second pallets extending outwardly from the water collection basin upon pivotal movements to their second positions.

6. The portable athletic field water fountain of claim 5 wherein the tube support frame comprises a pair of support columns fixedly attached to and extending upwardly from the base frame, and comprises at least a first cross beam spanning between and interconnecting the support columns, the fixed attachment of the tube to the tube support frame extending the tube along the at least first cross beam.

7. The portable athletic field water fountain of claim 6 further comprising valve means for controlling a flow of water through the tube; and further comprising a water outlet port for draining water out of the water collection basin.

8. The portable athletic field water fountain of claim 7 further comprising a pair of forklift arm receiving channels, each forklift arm receiving channel extending below the lower surface of the base frame, and being aligned and positioned for receiving the lift arms of a forklift.

9. The portable athletic field water fountain of claim 8 wherein the base frame, the floor, and the tube support frame are each composed of a material comprising aluminum.

10. A portable athletic field water fountain comprising:
   (a) a base frame, the base frame having an upper surface, a lower surface, and a plurality of inwardly facing walls;
   (b) a floor having an upper surface, the floor being fixedly attached to and positioned upon the base frame so that the upper surface of the floor spans between the inwardly facing walls of the base frame, and so that such inwardly facing walls extend upwardly from the upper surface of the floor, the floor and the inwardly facing walls of the base frame forming a water collection basin;
   (c) at least a first pallet, the at least first pallet being positionable within the water collection basin, and being adapted for, while so positioned, supporting at least a first athlete above water collected within the water collection basin;
   (d) a plurality of slide plates fixedly mounted upon the base frame, each slide plate among the plurality of slide plates extending downwardly from the base frame;
   (e) a tube having an inner surface, an outer surface, and a plurality of water emission apertures extending from the inner surface to the outer surface;
   (f) a tube support frame fixedly attached to the tube and spanning between the tube and the base frame, the tube support frame positioning the tube over the base frame so that water emitting from the water emission apertures falls into the water collection basin.

11. The portable athletic field water fountain of claim 10 wherein the at least first pallet comprises a water permeable grid and a grid supporting frame, the water permeable grid being fixedly attached to an upper surface of the grid supporting frame.

12. The portable athletic field water fountain of claim 11 further comprising a second pallet positionable within the water collection basin, the second pallet being adapted for, while so positioned, supporting a second athlete above water collected within the water collection basin.

13. The portable athletic field water fountain of claim 12 wherein the second pallet comprises a second water permeable grid and a second grid support frame, the second water permeable grid being fixedly attached to an upper surface of the second grid support frame.

14. The portable athletic field water fountain of claim 13 wherein the at least first pallet and the second pallet are pivotally mounted upon the base frame so that they may pivotally move between respective first and second positions, the at least first and the second pallets being positioned within the water collection basin upon pivotal movements to their first positions, the at least first and second pallets extending outwardly from the water collection basin upon pivotal movements to their second positions.

15. The portable athletic field water fountain of claim 14 wherein the tube support frame comprises a pair of support columns fixedly attached to and extending upwardly from the base frame, and at least a first cross beam spanning between and interconnecting the support columns, the fixed attachment of the tube to the tube support frame extending the tube along the at least first cross beam.

16. The portable athletic field water fountain of claim 15 further comprising valve means for controlling a flow of water through the tube; and further comprising a water outlet port for draining water out of the water collection basin.

17. The portable athletic field water fountain of claim 16 further comprising a pair of forklift arm receiving channels, each forklift arm receiving channel extending below the lower surface of the base frame, and being aligned and positioned for receiving the lift arms of a forklift.

18. The portable athletic field water fountain of claim 17 wherein the base frame, the floor, and the tube support frame are each composed of a material comprising aluminum.

* * * * *